(12) United States Patent  
Van Buskirk et al.

(10) Patent No.: US 8,826,836 B2
(45) Date of Patent: Sep. 9, 2014

(54) ROW TREATING UNIT FOR AGRICULTURE IMPLEMENT

(75) Inventors: Loyd C. Van Buskirk, Brownsdale, MN (US); Dylan C. Van Buskirk, Brownsdale, MN (US); Derek W. Allensworth, Macomb, IL (US)

(73) Assignees: L & B Manufacturing, Inc., Brownsdale, MN (US); Yetter Manufacturing Company, Colchester, IL (US)

( * ) Notice: Subject to any disclaimer, the term of this patent is extended or adjusted under 35 U.S.C. 154(b) by 116 days.

(21) Appl. No.: 13/594,388

(22) Filed: Aug. 24, 2012

(65) Prior Publication Data

US 2014/0053762 A1 Feb. 27, 2014

(51) Int. Cl.
*A01B 13/02* (2006.01)
*A01B 15/16* (2006.01)
*A01B 33/00* (2006.01)

(52) U.S. Cl.
USPC ........... 111/140; 111/163; 111/192; 111/200; 172/540; 172/551; 172/604; 172/166

(58) Field of Classification Search
USPC ......... 172/540, 542, 551, 554–556, 518, 604, 172/599, 601, 165, 166, 1; 111/118, 14, 111/149, 191, 140, 139, 157, 163, 167–169, 111/190, 192, 200
See application file for complete search history.

(56) References Cited

U.S. PATENT DOCUMENTS

| 3,177,828 A | 4/1965 | Cramer |
|---|---|---|
| 3,314,386 A | 4/1967 | Kopaska |
| 3,523,585 A | 8/1970 | Godbersen |
| 3,528,507 A | 9/1970 | Morkoski |
| 3,554,145 A | 1/1971 | Hornung et al. |
| 4,227,581 A | 10/1980 | Klotzback |
| 4,353,423 A | 10/1982 | Poggemiller |
| 4,422,511 A | 12/1983 | Poggemiller et al. |
| 4,444,130 A | 4/1984 | Ray |
| 4,489,789 A | 12/1984 | Pearce |
| 4,615,396 A | 10/1986 | Arnold |
| 4,624,471 A | 11/1986 | Haines et al. |
| 4,625,809 A | 12/1986 | Moynihan |
| 4,865,132 A | 9/1989 | Moore Jr. |
| 5,052,495 A | 10/1991 | McFarlane et al. |
| 5,479,992 A | 1/1996 | Bassett |

(Continued)

OTHER PUBLICATIONS

Korean Intellectual Property Office, International Searching Authority, International Search Report, Written Opinion of the International Searching Authority with Notice mailed May 16, 2012 in International Application No. PCT/US2011/057076, 9 pages.

(Continued)

*Primary Examiner* — Christopher J Novosad
(74) *Attorney, Agent, or Firm* — Nikolai & Mersereau P.A.; C. G. Mersereau

(57) ABSTRACT

This disclosure is directed to the field of agricultural machinery and relates to preplanting tillage implements generally used in combination with a seed planting device, or other multi-row implement. Specifically, the disclosure relates to row treating units incorporating a row clearance arrangement or a combination of tools that includes a row cleaning device and a soil penetrating coulter device. The units are designed to be attached to the front of a multi-row implement. The deployment of and down force exerted by the row cleaner is independently adjustable and controlled using pneumatic air bag operators.

20 Claims, 8 Drawing Sheets

(56) References Cited

U.S. PATENT DOCUMENTS

| | | |
|---|---|---|
| 5,562,054 A | 10/1996 | Ryan |
| 5,640,914 A | 6/1997 | Rawson |
| 5,797,460 A | 8/1998 | Parker et al. |
| 6,068,061 A | 5/2000 | Smith et al. |
| 6,135,567 A | 10/2000 | Cochran |
| 6,142,085 A | 11/2000 | Drever et al. |
| 6,389,999 B1 | 5/2002 | Duello |
| 6,581,530 B1 | 6/2003 | Hall et al. |
| 6,688,245 B2 | 2/2004 | Juptner |
| 6,701,857 B1 | 3/2004 | Jensen et al. |
| 6,926,093 B1 | 8/2005 | Fink et al. |
| 7,308,859 B2 | 12/2007 | Wendte et al. |
| 7,360,494 B2 | 4/2008 | Martin |
| 7,360,495 B1 | 4/2008 | Martin |
| 7,395,767 B2 | 7/2008 | Sulman |
| 7,426,893 B2 | 9/2008 | Wendte et al. |
| 7,451,712 B2 | 11/2008 | Bassett et al. |
| 7,472,658 B2 | 1/2009 | Ostlie |
| 7,574,969 B1 | 8/2009 | Henry et al. |
| 7,575,066 B2 | 8/2009 | Bauer |
| 7,578,246 B2 | 8/2009 | Ryder et al. |
| 7,594,546 B2 | 9/2009 | Ankenman |
| 7,640,875 B2 | 1/2010 | Forchino |
| 7,673,570 B1 | 3/2010 | Bassett |
| 7,861,660 B2 | 1/2011 | Martin |
| 7,866,410 B2 | 1/2011 | Ryder et al. |
| 7,921,931 B2 | 4/2011 | Henry et al. |
| 7,938,074 B2 | 5/2011 | Liu |
| 7,946,231 B2 | 5/2011 | Martin et al. |
| 7,975,630 B2 | 7/2011 | Bourgault et al. |
| 7,980,186 B2 | 7/2011 | Henry |
| 7,992,650 B2 | 8/2011 | Landoll et al. |
| 7,997,217 B2 | 8/2011 | Stark et al. |
| 8,028,632 B2 | 10/2011 | Ryder et al. |
| 8,028,759 B2 | 10/2011 | Ryder et al. |
| 8,042,620 B2 | 10/2011 | Henry |
| 8,047,147 B2 | 11/2011 | Harnetiaux |
| 8,069,798 B2 | 12/2011 | Martin |
| 8,100,192 B2 | 1/2012 | Henry et al. |
| 8,100,193 B2 | 1/2012 | Henry et al. |
| 2003/0024450 A1 | 2/2003 | Juptner |
| 2003/0226670 A1 | 12/2003 | Knobloch et al. |
| 2005/0263050 A1 | 12/2005 | Bassett et al. |
| 2008/0302283 A1 | 12/2008 | Martin |
| 2008/0314301 A1 | 12/2008 | Whalen et al. |
| 2009/0107370 A1 | 4/2009 | Ostlie |
| 2010/0006309 A1 | 1/2010 | Ankenman |
| 2010/0006310 A1 | 1/2010 | Bauer |
| 2010/0275827 A1 | 11/2010 | Van Buskirk et al. |
| 2010/0300710 A1 | 12/2010 | Bassett |
| 2011/0000410 A1 | 1/2011 | Manasseri et al. |
| 2011/0067613 A1 | 3/2011 | Martin |
| 2011/0179983 A1 | 7/2011 | Ryder et al. |
| 2011/0231069 A1 | 9/2011 | Ryder et al. |
| 2011/0232550 A1 | 9/2011 | Van Buskirk et al. |
| 2011/0239920 A1 | 10/2011 | Henry |
| 2011/0247537 A1 | 10/2011 | Freed |
| 2011/0247843 A1 | 10/2011 | Whalen et al. |
| 2011/0284252 A1 | 11/2011 | Friggstad et al. |
| 2011/0303137 A1 | 12/2011 | Tevs et al. |
| 2011/0308826 A1 | 12/2011 | Ryder et al. |
| 2012/0006240 A1 | 1/2012 | Henry |
| 2012/0012042 A1 | 1/2012 | Castagno Manasseri et al. |
| 2012/0012349 A1 | 1/2012 | Van Buskirk et al. |
| 2012/0017813 A1 | 1/2012 | Van Buskirk et al. |
| 2012/0042811 A1 | 2/2012 | Harnetiaux |
| 2012/0042814 A1 | 2/2012 | Harnetiaux |
| 2012/0048159 A1 | 3/2012 | Adams et al. |
| 2012/0060730 A1 | 3/2012 | Bassett |
| 2012/0060731 A1 | 3/2012 | Bassett |
| 2012/0151910 A1 | 6/2012 | Sauder et al. |
| 2012/0210919 A1* | 8/2012 | Van Buskirk et al. ........ 111/139 |

OTHER PUBLICATIONS

International Preliminary Report, dated Jan. 3, 2014.
Search Report and Written Opinion, dated Jan. 24, 2014.

* cited by examiner

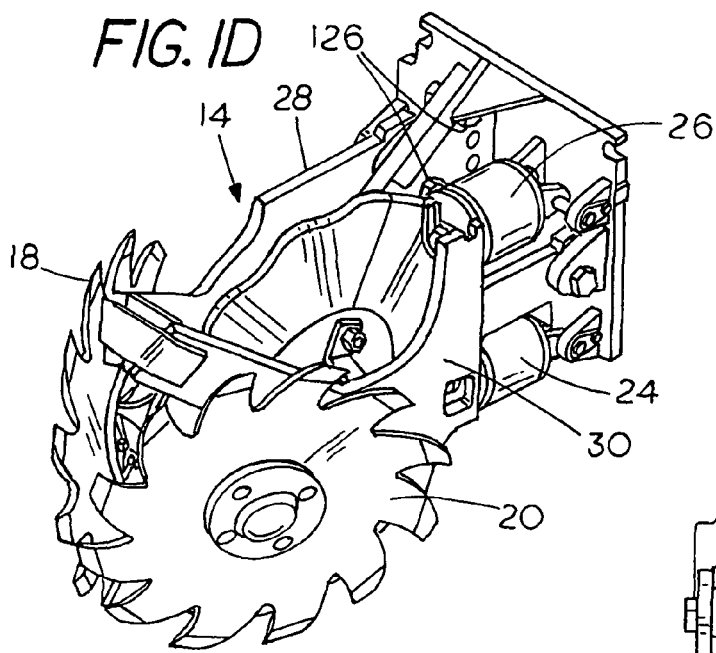
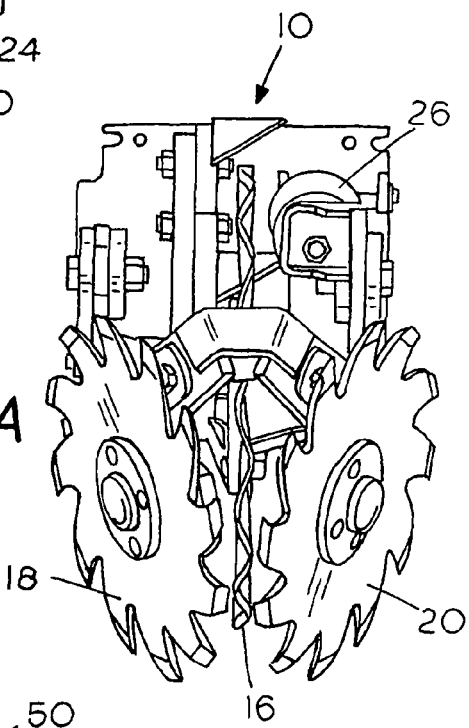
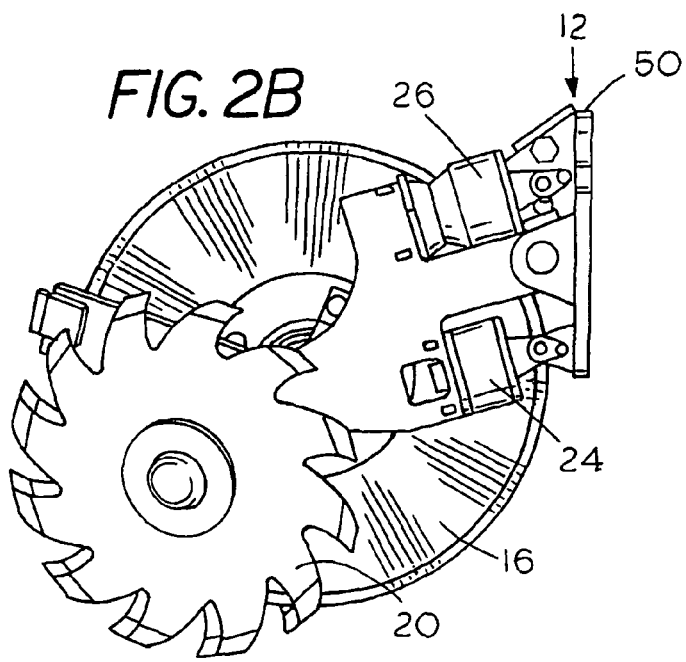

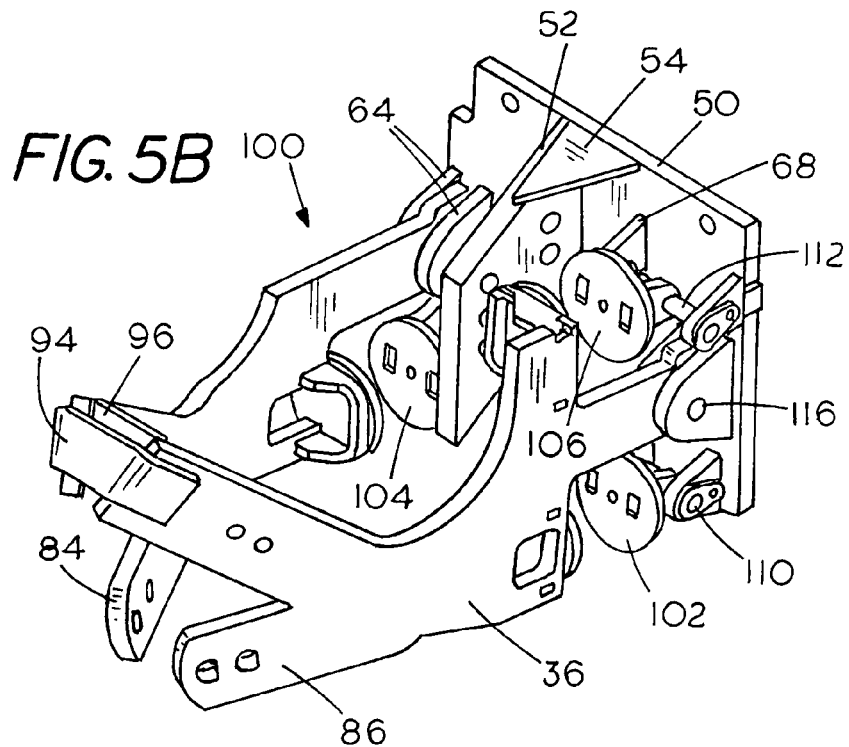
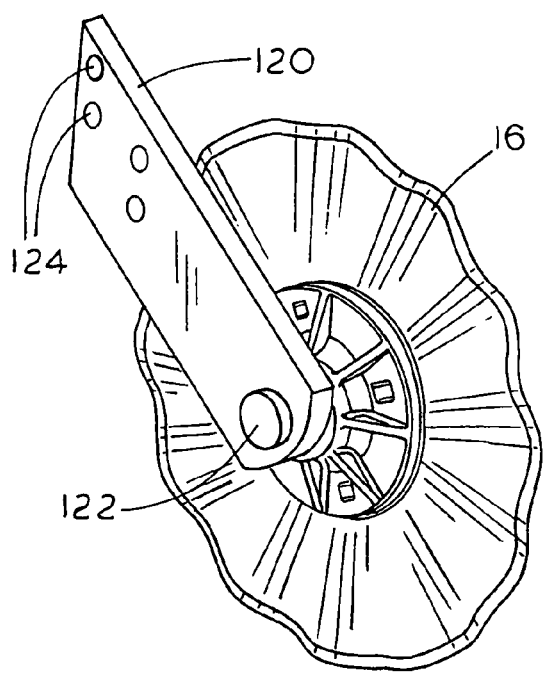 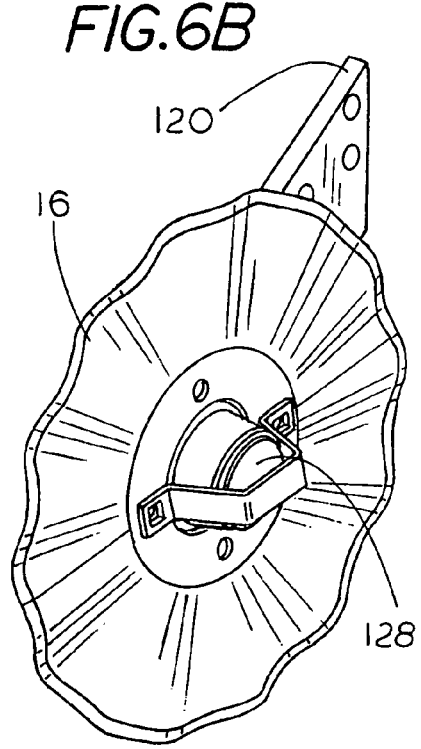

ROW TREATING UNIT FOR AGRICULTURE IMPLEMENT

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

This invention is directed generally to the field of agriculture machinery, and more particularly, it relates to a preplanting tillage implements generally used in combination with a seed planting device. Specifically, the invention relates to row treating units incorporating a combination of tools including row cleaning devices, also known as residue managers or trash whipping devices, and soil penetrating coulter devices. The units are designed to be attached to the front of a variety of implements including seed planting implements, fertilizer applicators and other soil treating applicators. The deployment and/or down force exerted by the row cleaner is independently adjustable and controlled using pneumatic operators.

II. Related Art

In the spring, prior to planting, farmers must prepare their fields for accepting seed. Many tillage implements have been designed and are used to condition the soil in preparation for planting. Traditional farming includes both primary and secondary tillage tasks to prepare the soil such as plowing, disking, field cultivating and harrowing. Disking is an example of a method of primary tillage and harrowing is an example of a method of secondary tillage.

Primary tillage is a first pass over the soil using a soil conditioning implement attached to the rear of a tractor which works deep into the soil. The soil is usually worked several inches deep to break up clods of soil, remove air pockets, and destroy weeds deep in the earth. Secondary tillage involves another pass over the same soil, at a more shallow depth, using implements which are generally attached to the rear of the primary tillage unit or to the front of a planter such that the secondary tillage unit follows the primary tillage unit. The secondary tillage unit generally may work the soil to a depth of a few inches or more usually not to exceed the desired seed planting depth.

A secondary tillage unit is usually a final conditioning tool to prepare the soil for planting. Various units may chop up crop residues, or move them out of the way to clean rows to be planted, break up soil clods and break up any crust on the top of the soil, provide seed furrows, weed control, incorporate chemicals into the soil, and stir and firm the soil closer to the surface.

Row cleaners and coulter devices are important types of secondary soil conditioning implements. Row cleaners include a pair of angled, converging multi-bladed trash wheels that could include optional floater wheels. These cleaners are primarily used to remove debris including residue, rocks, soil clods, etc., by pushing it to the side out of the way before seeding/planting. This also helps to eliminate "row unit bounce" that occurs when residue, rocks, clods, are encountered by agriculture machinery. Coulters include a sharp rotating blade or wedge wheel which is generally wavy or rippled about its circumference which is used to improve planting conditions by cutting through and loosening the soil before opening disks of the planter open the soil to place seeds. Typically coulters are set to cut through the soil to the same or slightly less depth than the opening disks of the planter and are particularly useful in harder soils where cutting and loosening the soil is important. Coulters may also be useful in fields containing a high volume of residue or trash from a previous crop, as they can cut through the trash making it easier to be pushed out of the way by row cleaners. In addition, coulters help eliminate side wall compaction created by planting/seeding implements.

Farmers obtain great benefit from using both coulters and row cleaners as a means of secondary tillage to prepare soil for planting. The ability to remove debris and break up soil may lead to more even plant emergence and increased planting population which, in turn, lead to better crop yields at harvest. Row cleaning, trash moving or trash whipping devices, then, represent a type of equipment which can be advantageously added to a row crop planter to handle amounts of crop residue often present on a field to be replanted, particularly if no till farming is being employed. Minimal till or no till farming, of course, leaves an amount of crop residue on a field which may interfere with subsequent seeding operations and so needs to be moved aside from planted/seeded rows. As indicated, row cleaners normally include pairs of angled disks with radially directed teeth or spikes which move crop residue out of the way in advance of planting/seeding. They are normally assembled so that the angled disks form a V-shape and they may or may not overlap.

One problem associated with the operation of row cleaners is controlling the depth of operation of the disk spikes in the field. Some of the present devices are mounted at a fixed vertical distance from a tool bar on a planter. The height is adjustable between a series of fixed vertical location settings only using movable bolts or pins. There is no independent control over the force exerted by the implement. The fixed location does not allow for row cleaners to follow ground terrain to perform at the setting desired. The pins may be used to adjust and limit the bottom or fixed maximum depth of the wheels with the weight of the trash wheels alone providing down force to the device.

Accordingly, it would be beneficial if the deployment and downward force exerted by the row cleaner could be varied and remotely controlled. Thus, if the lift force or down pressure force on the trash whipping device could be controlled and adjusted, as needed, it would present a distinct advantage. Down force adjustment allows adjustment for changing field conditions and terrain. Up force adjustment allows for adjustment to create ride and ability to raise quickly.

It would also be beneficial if a row unit including a trash whipping-type device with its pair of spiked disks mounted on a triangular mount to move debris out of the way were combined with the sharp steel blade of a coulter to cut the soil vertically and provide a shallow furrow through the soil just prior to planting.

SUMMARY OF THE INVENTION

The present concept is related to a row unit combining soil conditioning implements in the form of coulter and row cleaning devices to accomplish multiple tasks just prior to seeding in a single pass. An aspect of the present concept relates to mounting the row unit on planting equipment.

The row treating unit of the invention is designed to attach to other farm implements. In one preferred combination, the row treating units are attached to the front of planting/seeding equipment. Such units can be attached along a multi-row planter to treat each of the rows addressed by the planter.

The row treating unit of the invention is assembled with respect to and carried by a main unit mounting plate to which a row clearing assembly arrangement and a coulter blade mounting arrangement are fixed. The coulter blade mounting arrangement includes a substantially vertical coulter mounting plate having a series of spaced attachment locations for attaching a coulter mounting arm at various heights. The coulter mounting plate is attached to the unit mounting plate and at least one reinforcing gusset is attached between the unit mounting plate and said coulter mounting plate.

The row cleaning arrangement includes a pair of spaced row clearance wheel support arms having fixed ends pivotally mounted between pairs of spaced lugs fixed to the unit mounting plate and feature pneumatic actuating devices to produce and control lift and downward forces on the pivoting clearance wheel support arms. The pneumatic actuating devices or operators are preferably air bags mounted between spaced pads connected between the lift arms and the unit mounting plate using a swiveling pad attached to the unit mounting plate and a fixed pad attached to a lift arm for each operator. The lift arms have free ends that are connected together and have converging portions for attaching row clearance wheels in a triangular arrangement.

BRIEF DESCRIPTION OF THE DRAWINGS

In the drawings wherein like reference characters denote like parts:

FIGS. 1A-1D depict front elevation, right side elevation, left side elevation and perspective views of an assembled row unit in accordance with the invention shown with the row clearance arrangement in the raised or stowed position;

FIGS. 2A-2D are similar views to FIGS. 1A-1D with the assembled unit shown with the row clearance arrangement in the down or deployed position;

FIGS. 5A and 5B are left and right side front perspective views of assembled mounting plate and a row clearance wheel support arm arrangement;

FIGS. 6A and 6B are enlarged left and right side perspective views of a coulter blade assembly including an attachment arm.

DETAILED DESCRIPTION

Figure 1A:
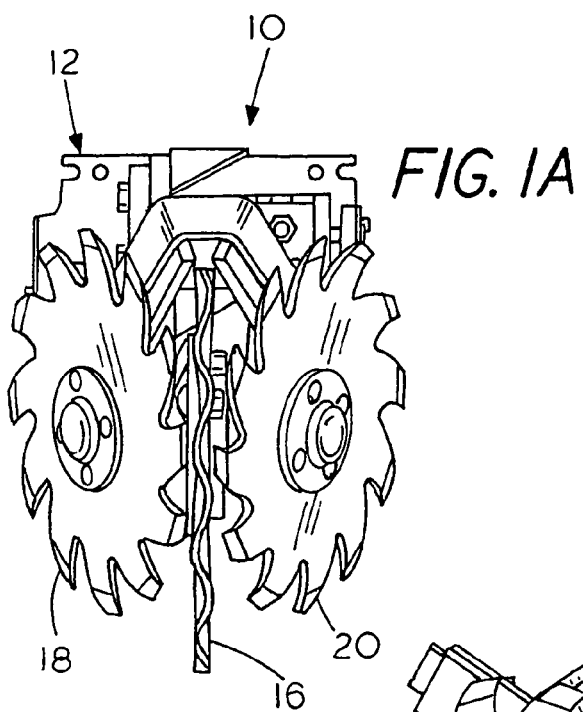
Figure 1B:
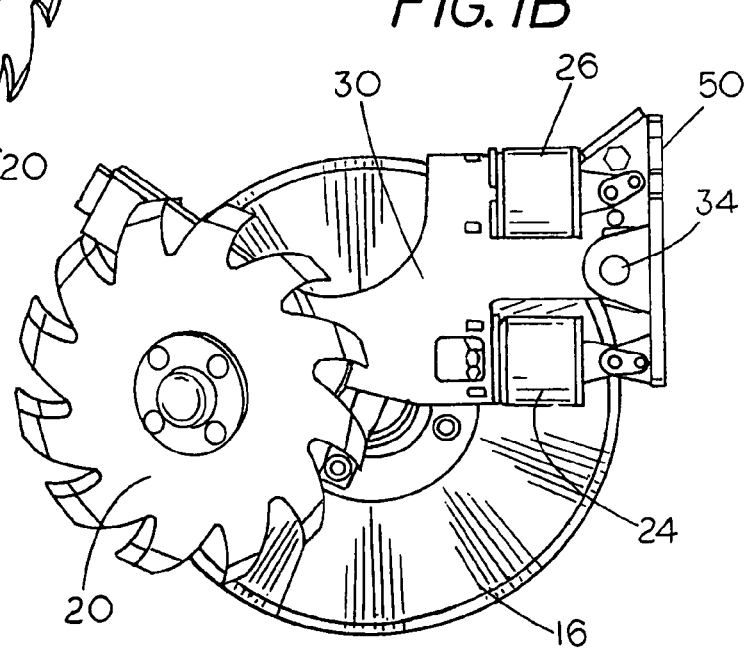
Figure 1C:
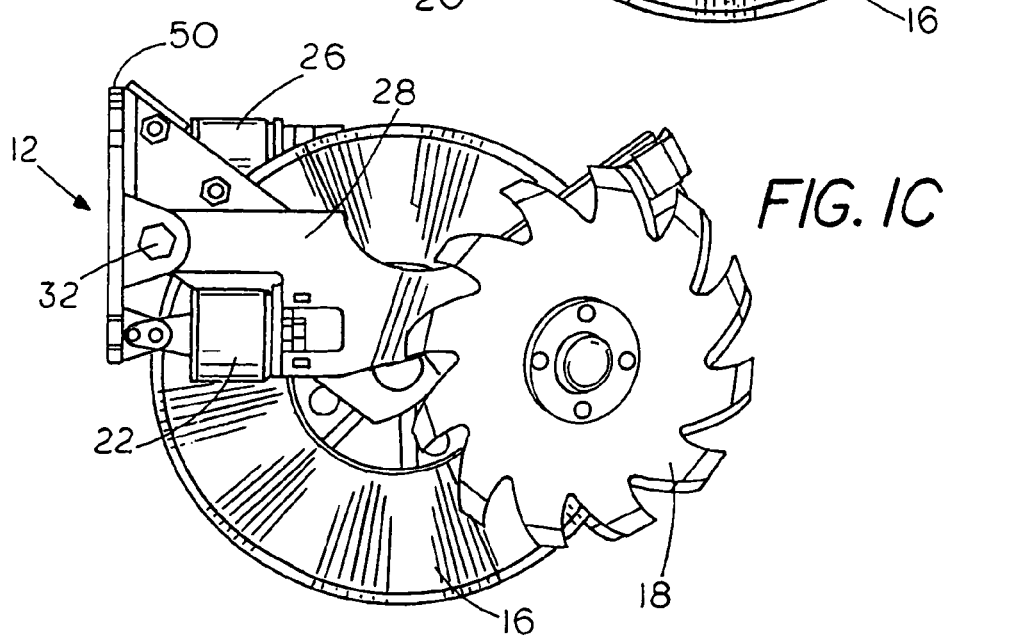
Figure 2C:
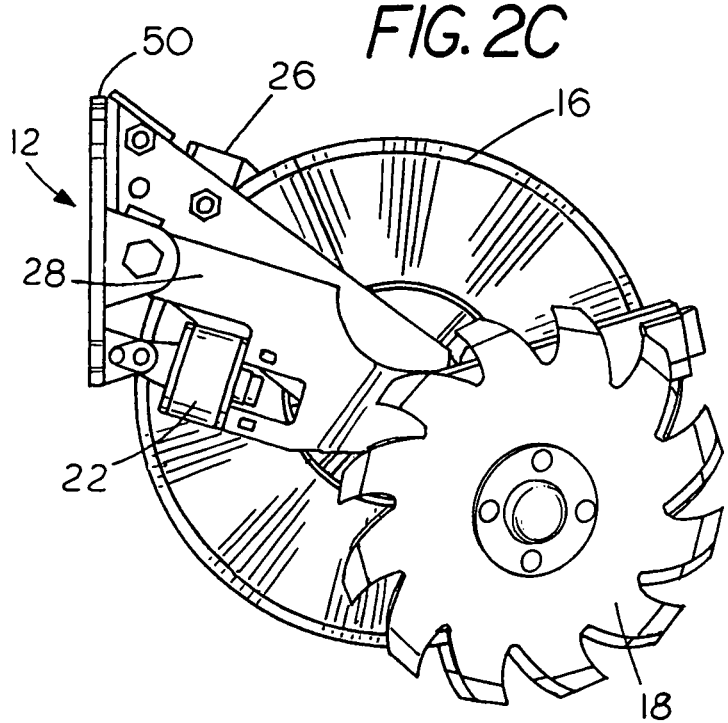
Figure 2D:
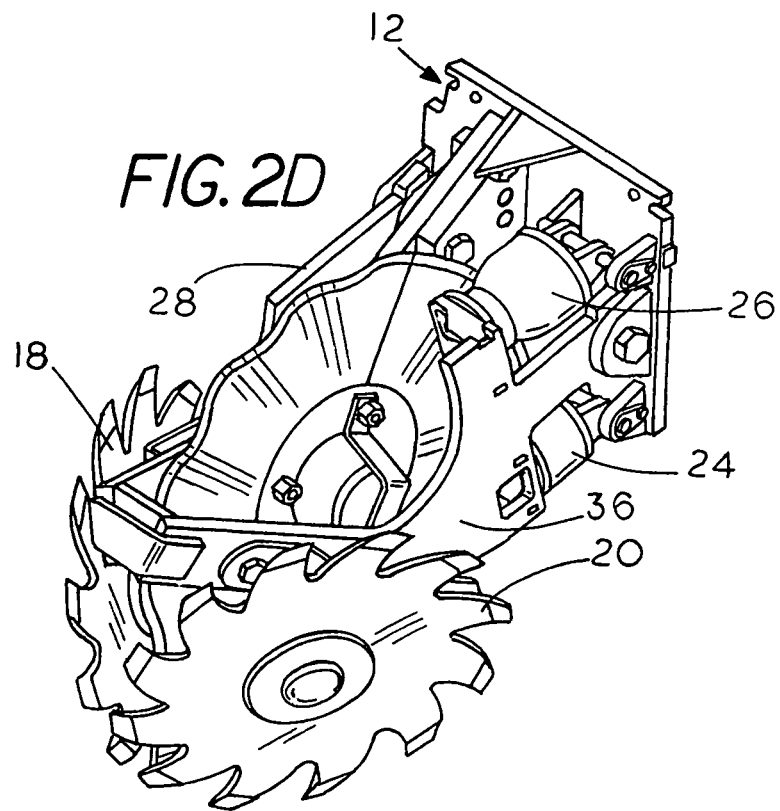

The detailed description of the preferred embodiments is intended to illustrate representative examples of inventive concepts and is not intended to be limiting as to the scope of the concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom", "left" and "right" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 8A:
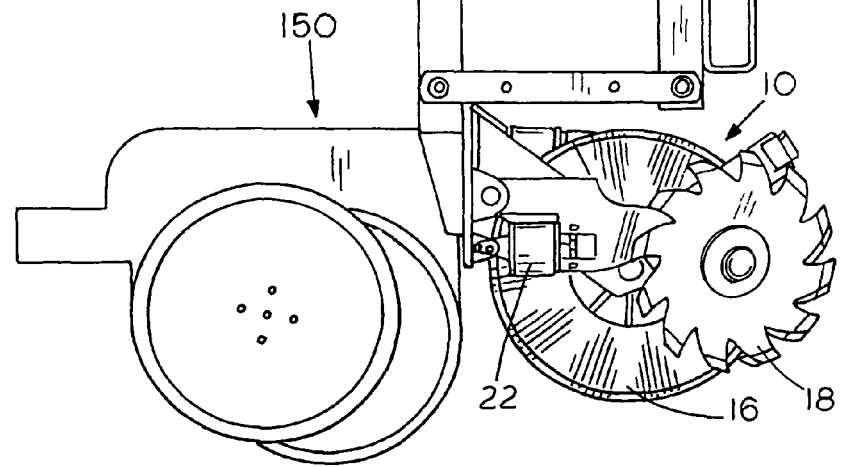
FIGS. 8A-8C depict opposite side elevational views (8A and 8B) and a perspective view (8C) of a row treating unit in accordance with the invention attached to the front of a seeding device.
Figure 8B:
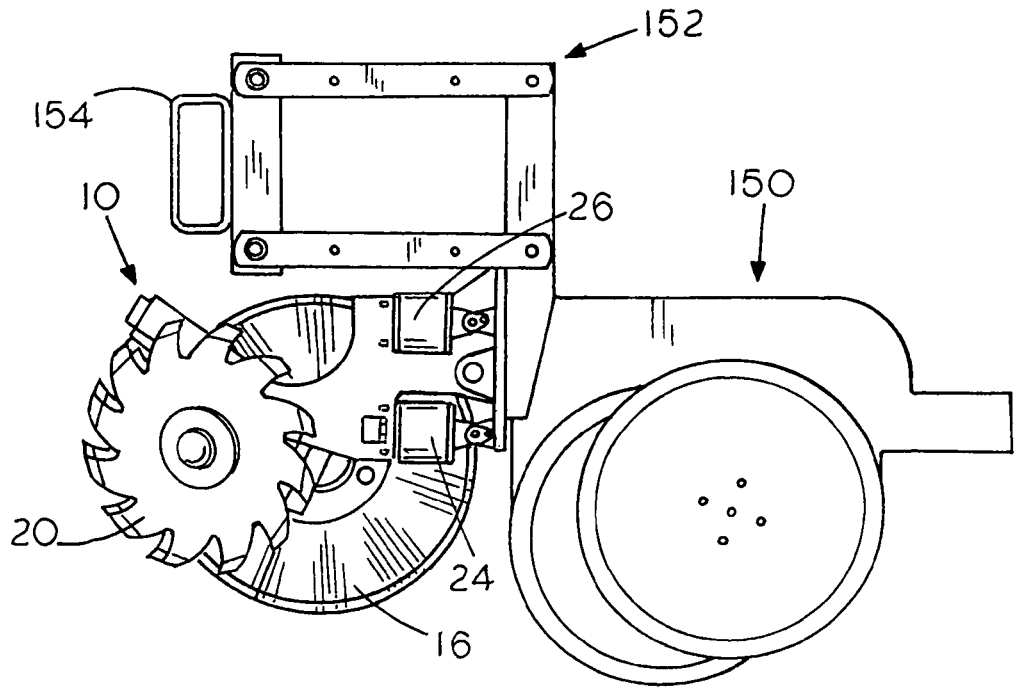

In FIGS. 1A-1D and 2A-2D there is shown an assembled row unit, generally at 10, in accordance with the invention which includes a mounting plate arrangement 12 (shown in greater detail in FIG. 3) designed to mount or attach the row unit to the front of a conventional multi-row planter assembly as shown in FIGS. 8A and 8B. The unit further includes several additional sub-assemblies including a pivotally mounted row clearance wheel support arm arrangement 14 (shown in greater detail in FIGS. 4A and 4B), a coulter blade mounting arrangement with coulter blade 16 and row clearance wheel assemblies including trash wheels 18 and 20. As viewed from the front of the row unit device, left and right side lifting air bags are shown at 22 and 24, respectively, and a down force air bag is shown at 26. The row clearance wheel support arm assembly includes left and right side arm members 28 and 30 which are pivotally mounted at 32 and 34, respectively.

Figure 3:
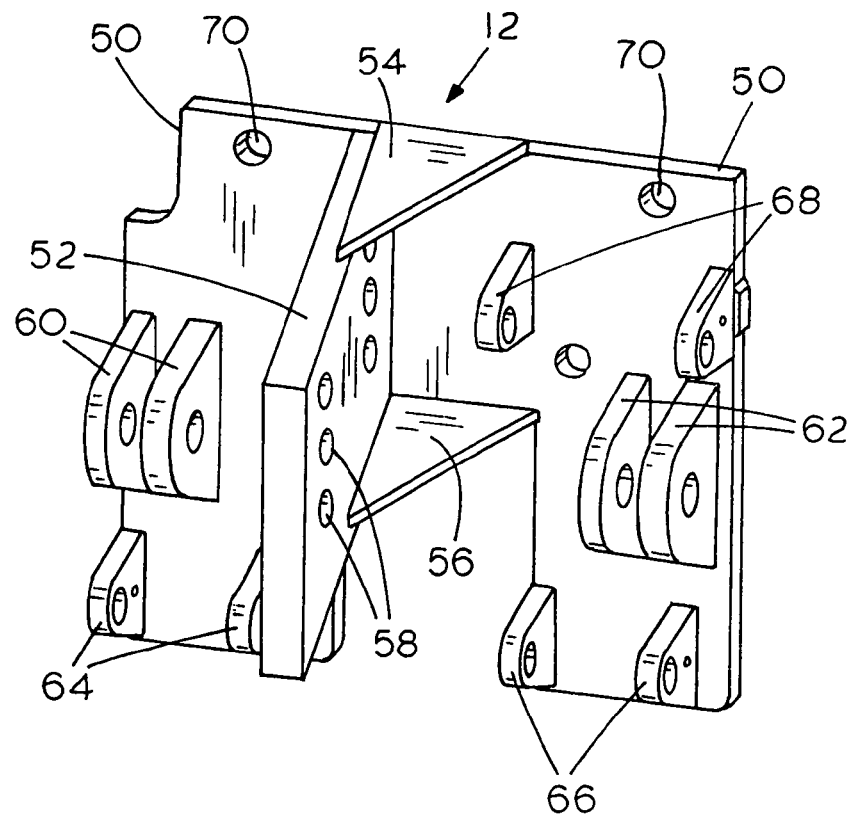
FIG. 3 is an enlarged front elevational perspective view of a mounting plate arrangement for the row unit.

FIG. 3 depicts an enlarged perspective detail view of a mounting plate arrangement 12 for the row unit and includes a heavy gauge base plate or row unit mounting plate member 50. A coulter arm mounting plate 52 is attached to the unit mounting plate, reinforced by upper and lower triangular gussets 54 and 56, and containing a series of coulter arm height adjusting openings 58. Pairs of row clearance wheel arm mounting plates or lugs are shown at 60 and 62 and pairs of spaced lugs for up force air bag swivel pads and shafts or spindles are shown at 64 and 66 and for down force bag swivel pads and spindles at 68. Mounting holes for the unit to be mounted to a planter are shown at 70.

Figure 4A:
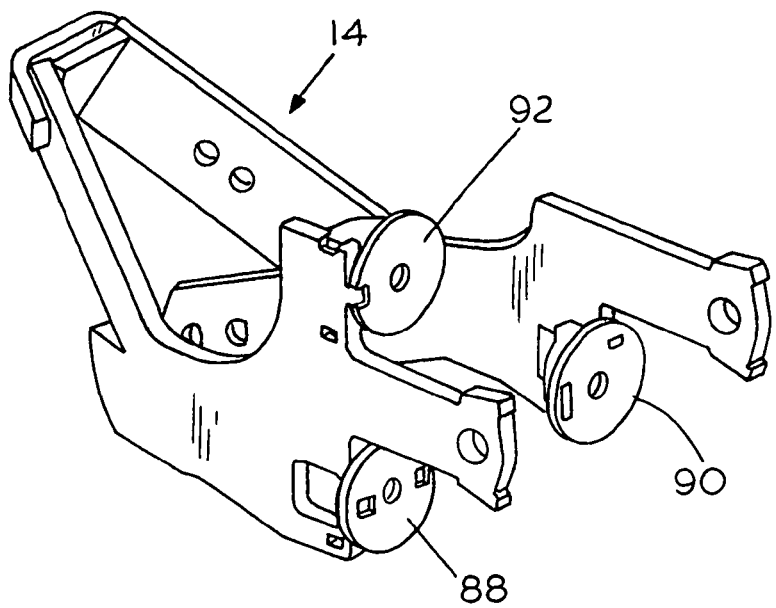
FIGS. 4A and 4B are rear and front perspective views of a row clearance wheel support arm arrangement.
Figure 4B:
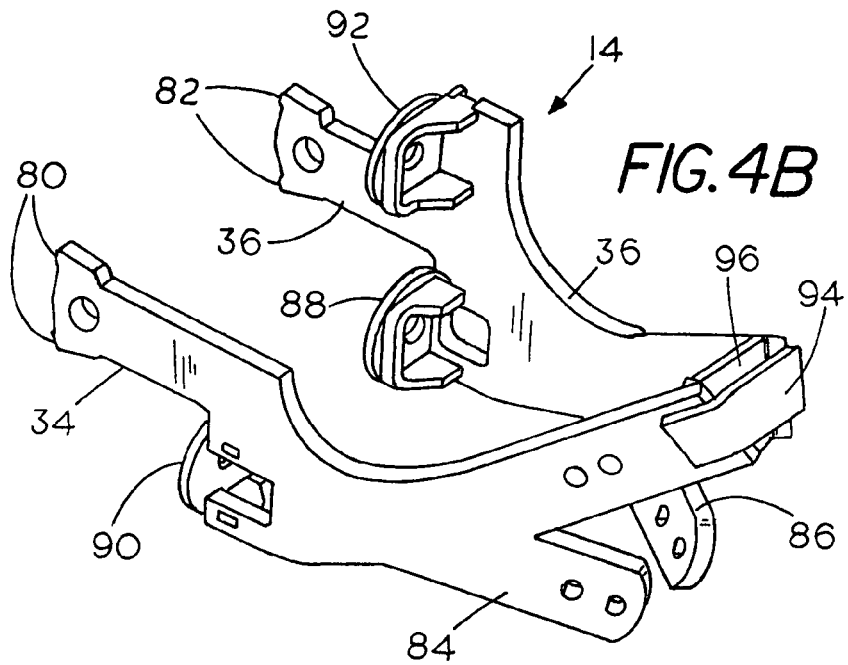

FIGS. 4A and 4B are enlarged detail drawings showing left and right side perspective views of assembled row clearance wheel support arrangement 14. Shaped arm members 34 and 36 are provided with pivot limiting stops as at 80 and 82, respectively, which limit both upward and downward pivoting of the arms. The arms 34 and 36 have converging front aspects at 84 and 86 for mounting the row clearance wheel arrangements in a triangle or converging posture. Pads fixed to the structure for connecting the assembly with corresponding air bags are shown at 88, 90 and 92. The arm members are connected together toward the free ends by additional members including a shaped strap member 94 and plate member 96.

Figure 5A:
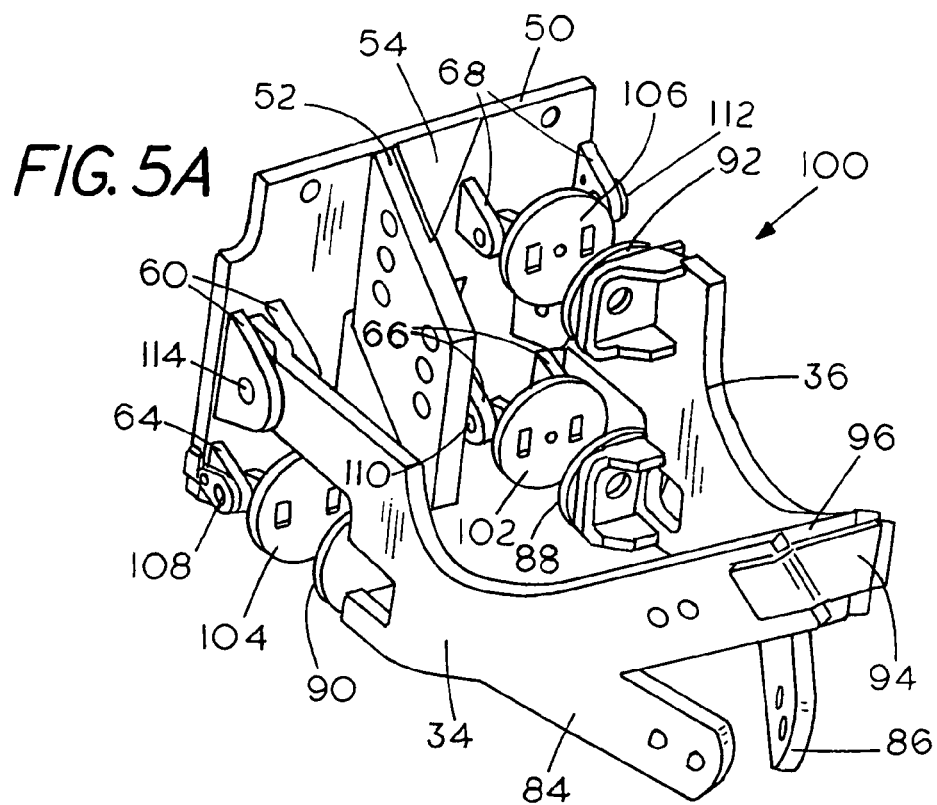

FIGS. 5A and 5B depict the mounting plate and row clearance wheel support arrangements assembled together with the air bags removed. The assembled arrangement 100 is carried by heavy plate member 50 and includes swiveling pads 102, 104 and 106 spaced from and associated with corresponding fixed pads 88, 90 and 92. The swivel pads are carried by the spaced pairs of lug members 64, 66 and 68 on spindles or shafts 108, 110 and 112 journaled in the pairs of corresponding spaced lug members which are attached to mounting plate member 50. Arm members 28 and 30 are pivotally mounted on shafts as at 114 and 116 journaled between corresponding spaced lug members 60 and 62 fixed to plate member 50.

In the enlarged views of FIGS. 6A and 6B, a coulter disc or wedge member 16 is shown mounted and journaled to rotate relative to a connected mounting arm 120 on a shaft 122. A plurality of spaced mounting holes 124 are provided which are designed to align with holes 58 in member 52 when the coulter is mounted to the unit such that the coulter can be mounted in any one of several fixed height positions which, in turn, determine the depth that the coulter blade or wedge will penetrate the soil as deployed. Bolts 126 (FIGS. 1D and 2D) are inserted through corresponding openings 124 in mounting arm 120 and 58 in member 52 to fix the coulter at a desired depth which can be manually adjusted as needed. A hub is shown at 128.

Figure 7A:
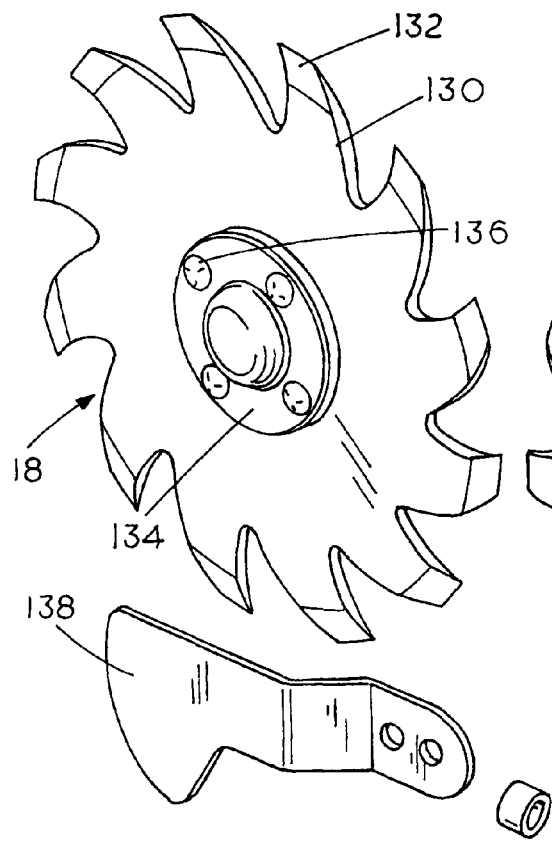
FIGS. 7A and 7B are enlarged left and right side perspective views of row clearance wheel assemblies.
Figure 7B:
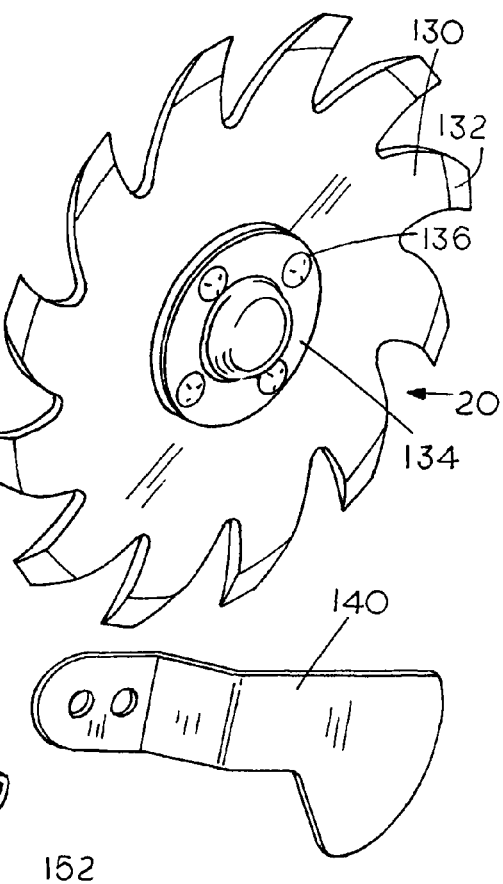

FIGS. 7A and 7B depict enlarged views of trash wheel assemblies including trash wheels 18 and 20. The large spaced teeth of the wheels are shown at 130 and these may have specially heat treated or hardened tips as at 132. The wheels include hubs 134 with mounting bolts 136 and wheel scraper devices for the wheels are shown at 138 and 140.

Figure 8C:
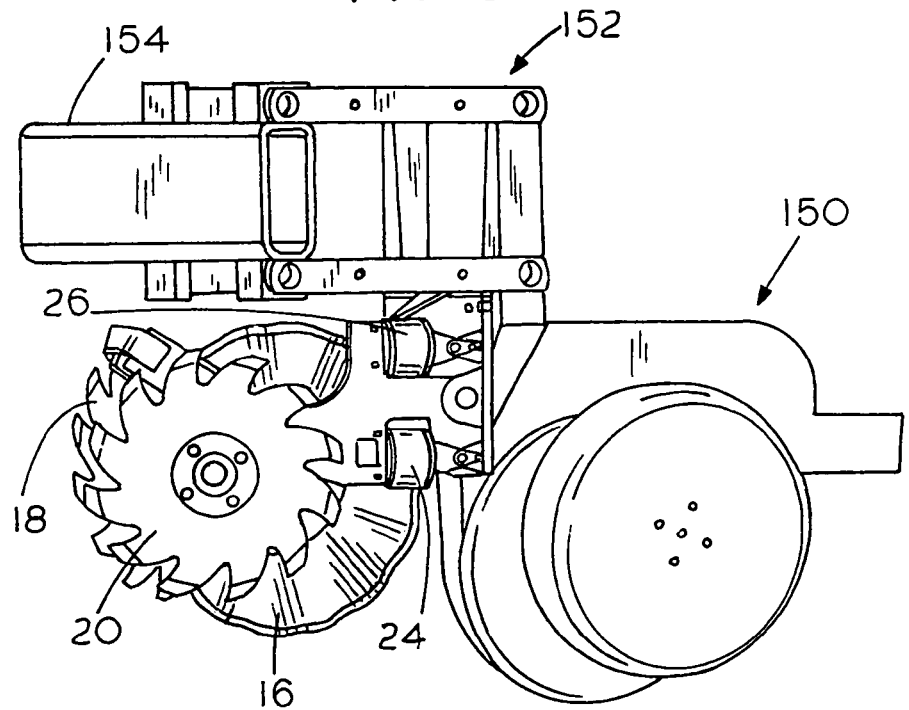

FIGS. 8A-8C depict opposite side elevational views and a perspective view of a row treating unit in accordance with the invention attached to the front of a seeding device, shown schematically at 150. A frame 152 is attached to the planter and to a common tube 154 which extends along the length of the planter and is, in turn, connected to a tractor or the like in a known manner for pulling the entire system along to treat a field.

It will be appreciated that the use of both down force and up force or lifting pneumatic operators, preferably air bags, enables more variation and control of the force exerted by the row clearance assembly and represents a distinct advantage over gravity dependant systems with adjustable, but fixed position wheels using pins or bolts and spaced holes to attach the wheels to the support arms. The pneumatic operators can be adapted to operate using any compatible source of pressurized air. Such systems generally include a compressor, accumulator tank and associated control valves with input and vent connections, and are well known and need not be explained in detail. The pressure in the air bags is infinitely variable and so the force exerted on the system may be modulated and controlled using both electronic and/or manual regulators and adjustments may be made as needed during use of the equipment.

In one preferred embodiment, an air solenoid or similar pneumatic valve may be used to connect fill and exhaust ports to the air bags such that when the lift air bags are inflated, the down force bag may deflate through an exhaust port and when the down force air bag is connected to receive pressurized air, the lift air bags may be connected to an exhaust port. Generally, however, high pressure air will be fed to both lift and down force air bags at the same time with the relative force controlled. Minimal lifting force is applied to lift the support arms and the wheels to the top of their travel. Then down force is applied to overcome the lifting force pushing the support arms and trash wheels to the ground. This creates a floating action as the unit travels through a field. The pressure in the down force air bag can be adjusted to and controlled at any level to meet changes in soil conditions as they are encountered. When the unit is not processing residue or other material the lift air bag can be used to raise the row clearance wheels to a stowed disposition while exhausting the down force air bag. Manual and automated controls located in the cab of a prime mover such as a farm tractor adapted for pulling a multi-row planter to which a plurality of row units are attached can be used to control the air bags associated with each row unit in accordance with the invention.

In use, a plurality of row units in accordance with the invention are attached in spaced relation along the front of a multi-row planter pulled by a tractor. The row treating units are spaced in accordance with the desired crop row spacing. The row treating units combine the soil cutting and loosening action of the coulter with the action of the row clearing wheels to move crop residue from a previous crop to the side leaving a clear path for the opening discs of the planter and subsequent seeding. The associated coulter is normally set to penetrate the soil to a depth comparable to or slightly less than the depth of opening discs on the planter.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

For example, while air bag pneumatic operating devices may be preferred, it is contemplated that pneumatic cylinders or hydraulic cylinders, or the like, could be adapted to be used to control the deployment of and down force exerted by the row clearance device so long as the net force exerted on the row clearance device can be properly controlled. This has been found to be readily accomplished using air bags.

What is claimed is:

1. A row treating unit for attachment to an agricultural implement comprising:
    (a) a unit mounting plate arrangement for carrying the row treating unit and attaching the row treating unit to another farm implement;
    (b) a coulter blade mounting arrangement for carrying a coulter blade attached to the unit mounting plate arrangement such that the coulter operates at a variable selected fixed depth; and
    (c) a selectively deployable and force adjustable row clearance assembly comprising a row clearance wheel support arm arrangement comprising a pair of spaced support arms having fixed ends pivotally mounted to said unit mounting plate arrangement, said row clearance wheel support arm arrangement including an arm actuating arrangement designed to be air operated comprising actuating pad sets of spaced opposed swiveling and fixed pads for accepting air operated bags mounted therebetween for controlling upward and downward directed forces on said pair of spaced support arms, said arm actuating arrangement further comprising converging portions for attaching row clearance wheels.

2. A row treating unit as in claim 1 wherein said arm actuating arrangement further comprises at least one set of actuating pads positioned for applying a variable lifting force to said row clearance wheel support arm arrangement and at least one set of pads positioned for applying a variable down force to said row clearance wheel support arm arrangement.

3. A row treating unit as in claim 2 wherein said arm actuating arrangement further comprises two sets of actuating pads positioned for applying a lifting force.

4. A row treating unit as in claim 3 further comprising inflatable air bag devices mounted in said actuating pad sets.

5. A row treating unit as in claim 2 further comprising inflatable air bag devices mounted in said actuating pad sets.

6. A row treating unit as in claim 1 wherein said coulter blade mounting arrangement comprises a substantially vertical coulter mounting plate having a plurality of attachment locations for attaching a coulter mounting arm at various heights, said coulter mounting plate being attached to said unit mounting plate and at least one reinforcing gusset attached between said unit mounting plate and said coulter mounting plate.

7. A row treating unit as in claim 1 further comprising a coulter blade mounted on said coulter blade mounting arrangement.

8. A row treating unit as in claim 1 further comprising a pair of row clearance wheels mounted on said support arms.

9. A row treating unit as in claim 1 wherein each of said swiveling pads is carried by a pair of spaced lug members fixed to said unit mounting plate.

10. A row treating unit as in claim 1 wherein said support arms include means for limiting pivoting travel.

11. A row treating unit as in claim 10 wherein said support arms include means for limiting pivoting travel.

12. A row treating unit as in claim 1 wherein the unit is designed to attach to a planter/seeding implement.

13. A row treating unit as in claim 1 further comprising a pair of row clearance wheels mounted on said support arms.

14. A row treating unit as in claim 1 wherein each of said swiveling pads is carried by a pair of spaced lug members fixed to said unit mounting plate. arms.

15. A row treating unit for attachment to an agricultural implement comprising:
   (a) a unit mounting plate arrangement for carrying the row treating unit and attaching the row treating unit to another farm implement;
   (b) a row clearance assembly comprising a row clearance wheel support arm arrangement comprising a pair of spaced support arms having fixed ends pivotally mounted to said unit mounting plate arrangement, said row clearance wheel support arm arrangement including an arm actuating arrangement designed to be air operated comprising actuating pad sets of spaced opposed swiveling and fixed pads for accepting air operated bags mounted therebetween for controlling upward and downward directed forces on said pair of spaced support arms, said arm actuating arrangement further comprising converging portions for attaching row clearance wheels.

16. A row treating unit as in claim 15 wherein said actuating arrangement further comprises at least one set of actuating pads positioned for applying a lifting force to said row clearance wheel support arm arrangement and at least one set of pads positioned for applying a down force to said row clearance wheel support arm arrangement.

17. A row treating unit as in claim 16 wherein said actuating arrangement further comprises two sets of actuating pads positioned for applying a lifting force.

18. A row treating unit as in claim 17 further comprising inflatable air bag devices mounted in said actuating pad sets.

19. A row treating unit as in claim 16 further comprising inflatable air bag devices mounted in said actuating pad sets.

20. A row treating unit as in claim 15 wherein the unit is designed to attach to a planter/seeding implement.

\* \* \* \* \*

UNITED STATES PATENT AND TRADEMARK OFFICE
CERTIFICATE OF CORRECTION

PATENT NO. : 8,826,836 B2  
APPLICATION NO. : 13/594388  
DATED : September 9, 2014  
INVENTOR(S) : Loyd C. Van Buskirk et al.

Page 1 of 1

It is certified that error appears in the above-identified patent and that said Letters Patent is hereby corrected as shown below:

In the Claims,

In claim 14, column 7, line 19, remove the word "arms." after the word "plate".

Signed and Sealed this
Second Day of December, 2014

Michelle K. Lee
*Deputy Director of the United States Patent and Trademark Office*